H. W. FISHER.
CABLE CONSTRUCTION.
APPLICATION FILED MAR. 24, 1910.
964,961.
Patented July 19, 1910.
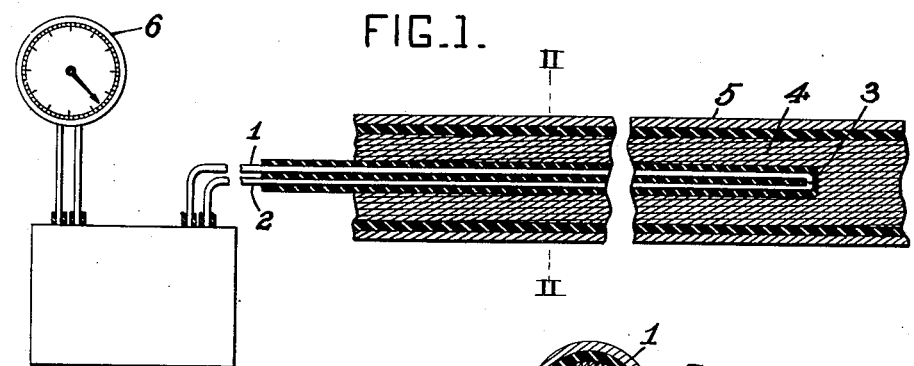
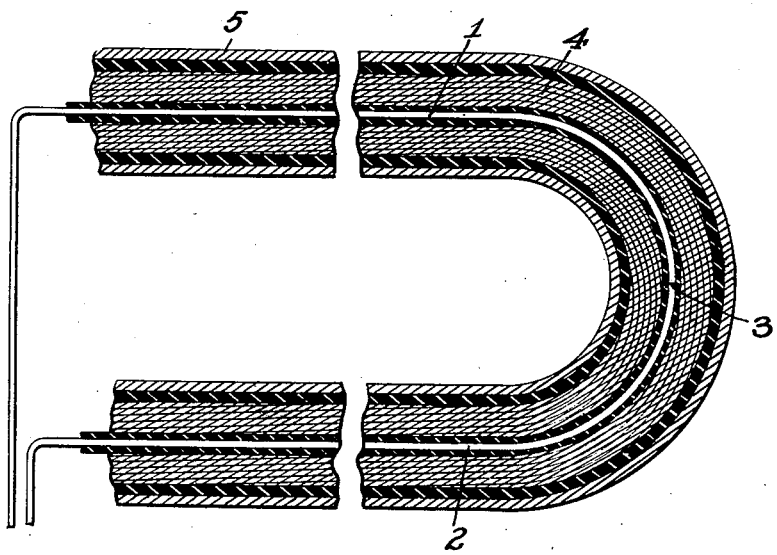
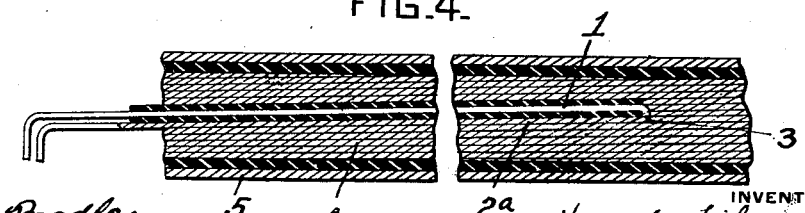
WITNESSES:
J. Herbert Bradley.
Francis J Tomasson
INVENTOR
Henry W. Fisher
by Christy and Christy
Atty's

UNITED STATES PATENT OFFICE.

HENRY W. FISHER, OF PITTSBURG, PENNSYLVANIA, ASSIGNOR TO STANDARD UNDERGROUND CABLE COMPANY, OF PITTSBURG, PENNSYLVANIA, A CORPORATION OF PENNSYLVANIA.

CABLE CONSTRUCTION.

964,961.   Specification of Letters Patent.   Patented July 19, 1910.

Application filed March 24, 1910. Serial No. 551,296.

*To all whom it may concern:*

Be it known that I, HENRY W. FISHER, residing at Pittsburg, in the county of Allegheny and State of Pennsylvania, a citizen of the United States, have invented or discovered certain new and useful Improvements in Cable Construction, of which improvements the following is a specification.

My invention relates to means for detecting temperature within the body of an electrical cable at relatively remote and inaccessible points in the length thereof. The particular instrumentality which I employ is the thermal couple, and my invention lies in adaptation of the members of the thermal couple itself and in assembling them with the cable strand or strands and inclosing the whole within the cable sheath.

In the use of electrical cables, the heat generated by the current flowing in the conductor becomes at times so great as to impair or destroy the cable. The usual effect of excessive heat is the breaking down of the insulation, and the consequent escape of current. Such accident is most likely to happen where the intensity of current is greatest, or where the greatest number of conductors are gathered within a small space conditions which commonly exist in trunk lines leading from power stations, and like situations. By employing means for detecting temperature at such a point of strain, and knowing the critical temperature for the insulation employed, I am able to discover weakness in the system and prevent accident of the nature suggested above.

My invention consists in adapting the thermal couple to this particular use by forming its elements of wire, and in gathering the wire or wires of the thermal couple, properly insulated, with the conductor or conductors of the cable. In some instances I find it desirable to employ a conductor of the cable as one of the elements of the thermal couple.

In the accompanying drawings which form part of this specification, Figure 1 is a view in medial longitudinal section of an electrical cable with my invention applied thereto; and in this figure are also shown diagrammatically an indicator for the thermal couple together with means for standardizing the readings. Fig. 2 is a view in transverse section of the cable of Fig. 1, the plane of section being indicated at II—II, Fig. 1; Fig. 3 is a view similar to Fig. 1 illustrating an alternative arrangement which may be found preferable under certain circumstances. Fig. 4 is also a view in longitudinal section, illustrating a modification of construction.

Parts which are repeated in the several figures bear the same reference numerals in each case.

The thermal couple is made up of two wires of different metals, 1 and 2, electrically united, as at 3, properly insulated from one another and from the conductor or conductors of the cable, 4, and gathered with the latter within the cable sheath, 5. The free ends of this couple are electrically united through an indicating device, 6. The principle upon which the thermal couple acts is that when lengths of dissimilar metals are so related to one another, difference in temperature at opposite ends of the couple effect a flow of current, which current is proportioned in intensity to the inequality in temperature referred to. This being the case, and the union 3 of the elements of the couple being located at the desired point in the installation, determination of temperature at that point becomes possible.

In order to standardize the readings of the instrument 6, and determine not merely divergence in temperature at opposite ends of the couple, but actual temperature at the remote point, 3, it is only necessary to maintain the temperature at the accessible end of the couple fixed. This is ordinarily accomplished by introducing the free ends of the couple to an ice bath, 7.

In order to calibrate the readings of the indicator 6 I may use a standardizing thermal couple of the same metals as employed in the thermal couple of the cable; by varying the temperature of the extremities of said standardizing thermal couple the temperatures corresponding to readings of the indicator can readily be determined.

It will be understood that the cable length which contains the thermal couple will ordinarily be assembled in the shop, and when installed it will be so placed as to bring the point where the union 3 is effected to the desired situation in the system.

My invention is not limited to the use of any particular metals; the range of available material for various ranges of temperature is well known to physicists. For very great ranges of temperature, thermal couple are commonly made of platinum alloys, and are very costly. For my purposes, involving a range of not more than 100 degrees C. iron and copper will form a serviceable couple, or iron and a metal compound by the trade-name "advance" wire may be employed; though, as I have said, I do not limit myself to any particular metals.

In Fig. 3 an arrangement is adopted which is possible where the couple may extend throughout the circuit of a cable. The two elements of the couple instead of being laid side by side within the cable body, lie end to end, in a single strand, throughout the length of the cable. In this arrangement also the union 3 will lie at the point in the extent of the cable where temperature is to be observed.

In Fig. 4 one element of the couple, which may be assumed to be a length of iron wire properly insulated is the same as in the instances already described. The other element in this case consists of a copper wire 2 one of the cable strands.

It will be understood that the invention in any one of these alternative arrangements may be employed in connection with electrical cables of various constructions, whether single-conductor or multiple-conductor cables, or whether the cable be formed of insulated or contacting strands, or whether the cable be sheathed in lead or otherwise incased.

In case the two elements of the couple lie side by side, as in Fig. 1, it will be understood that the point of union 3 need not be at the extremity of the parallel lines, but may lie at some intermediate point; in which case all of one strand and a portion of the other will be of one metal and the remainder of the second strand will be of the other metal.

I claim herein as my invention:

1. In an electrical cable the combination with the cable conductor of a thermal couple whose members are assembled with the cable conductor in the make-up of the cable, substantially as described.

2. In a cable structure the combination with a cable strand and a strand of a dissimilar metal, the cable strand and the strand of dissimilar metal being electrically connected at the opposite ends of the latter, to form a thermal couple, substantially as described.

In testimony whereof, I have hereunto set my hand.

HENRY W. FISHER.

Witnesses:
ALICE A. TRILL,
FRANCIS J. TOMASSON.